United States Patent [19]
Burgert

[11] Patent Number: 5,716,165
[45] Date of Patent: Feb. 10, 1998

[54] PROCESS AND INSTALLATION FOR GARBAGE DISPOSAL

[75] Inventor: Herbert A. Burgert, Triesenberg, Liechtenstein

[73] Assignee: Unitechnic Anstalt, Triesenberg, Liechtenstein

[21] Appl. No.: 406,974

[22] PCT Filed: Jun. 9, 1994

[86] PCT No.: PCT/CH94/00115

§ 371 Date: Mar. 17, 1995

§ 102(e) Date: Mar. 17, 1995

[87] PCT Pub. No.: WO95/03141

PCT Pub. Date: Feb. 2, 1995

[30] Foreign Application Priority Data

Jul. 19, 1993 [CH] Switzerland ............... 2174/93

[51] Int. Cl.$^6$ ....................................... B09B 1/00
[52] U.S. Cl. ................... 405/129; 52/DIG. 9; 405/128
[58] Field of Search .............................. 405/128, 129; 52/2.16, 2.17, DIG. 9

[56] References Cited

U.S. PATENT DOCUMENTS

| | | | |
|---|---|---|---|
| 4,753,551 | 6/1988 | Brueggemann et al. | 405/129 X |
| 4,936,706 | 6/1990 | Luftenegger et al. | 405/128 |
| 5,035,537 | 7/1991 | Rose | 405/128 |
| 5,067,852 | 11/1991 | Plunkett | 405/128 |
| 5,120,161 | 6/1992 | Faussone | 405/129 |
| 5,169,263 | 12/1992 | Johnson et al. | 405/128 |
| 5,201,609 | 4/1993 | Johnson | 405/129 |
| 5,203,644 | 4/1993 | Menkhaus et al. | 405/128 |
| 5,318,383 | 6/1994 | Yates et al. | 405/129 |
| 5,356,452 | 10/1994 | Fahey | 405/128 X |
| 5,361,550 | 11/1994 | Kaden | 405/128 X |

*Primary Examiner*—George A. Suchfield
*Attorney, Agent, or Firm*—Jenkens & Gilchrist

[57] ABSTRACT

The installation in accordance with the invention consists of a roof (6) and of walls (9)—consisting of plastic tarpaulins (12, 13), for example—by means of which the sanitary landfill (1) that is to be stripped and the apron area (3) of a recycling installation (2) can be covered and closed off from the outside world in an airtight manner. A suction apparatus (16) provides for the necessary negative pressure in the range from 10 to 100 Pa. In the region of the apron area (3), the roof (6) rests on fixed supports (7), and in the region of the sanitary landfill on movable supports (10), which are mounted on crawler vehicles (41). The fixed supports and the movable supports (7, 10) carry lightweight beams (11), which form the supporting framework for the roof. One vehicle (14) carries a tarpaulin roll (15) through the use of which the stripping area (9) can be continuously expanded by means of side tarpaulins (13) while maintaining the necessary negative pressure.

12 Claims, 4 Drawing Sheets

PROCESS AND INSTALLATION FOR GARBAGE DISPOSAL

BACKGROUND

The present invention pertains to a process, and an installation that works in accordance with the process, for the disposal of garbage, specifically, of garbage that is stored in dumps and landfills.

In the following, the term garbage is understood to mean: Household garbage, industrial wastes, construction rubbish and special garbage of all types. Such garbage is, to be sure, burned in many areas, but the majority of the garbage that occurs on a daily basis is at least stored for a long intermediate period in dumps or landfills. In many locations there exist in addition abandoned dumps, some of which have highly toxic industrial waste, and which represent an imminent hazard to the environment because the stored materials make their way into the ground water and/or the air either directly or by means of products that arise as a result of the chemical reactions that are taking place in the dumps.

While the problem of disposal of the garbage that is continuously coming into being may be considered to be solved as such—although even here continuously improved processes are being developed—the disposal of garbage dumps and landfills is associated with large problems as soon as such dumps are cut into. In particular, dust, gases, sludge, and aerosols are released which represent a hazard to the environment, or at the very least, a nuisance.

It is the task of the invention to create a process, and an installation that works in accordance with the process, which avoids the above-mentioned environmental hazards and nuisances.

SUMMARY

In one embodiment, the invention comprises an apparatus for the disposal of garbage that is stored in sanitary landfills, having gases and liquids present therein, with a recycling installation comprising: a stripping area located in the sanitary landfill; an apron area located in the recycling installation; a stripping area enclosure including: a stripping area roof and stripping area walls positioned to cover the stripping area, said stripping area roof and said stripping area walls comprise substantially airtight materials which are connected in a substantially airtight manner to themselves and to the ground outside the stripping area; and movable supports for supporting the stripping area roof and the stripping area walls; an apron area enclosure including: an apron area roof and apron area walls positioned to cover the apron area, said apron area roof and apron area walls comprise substantially airtight materials which are connected in a substantially airtight manner to themselves and to the ground outside the apron area; and fixed supports for supporting the apron area roof the apron area walls, and the airtight materials covering the apron area; mechanical means for the stripping of garbage from the sanitary landfill; mechanical means for transporting the stripped garbage from the stripping area to the apron area; a first suction device for the creation of a negative pressure in the apron area enclosure and the stripping area enclosure in a range from ten to one hundred pascal in the stripping area enclosure and the apron area enclosure, the negative pressure is with respect to the areas outside the stripping area enclosure and the apron area enclosure; drainage lances positioned into the stripping area of the sanitary landfill, said drainage lances are tubular in shape and include holes in the sides of the drainage lances for drawing off the gases and liquids which are present in the sanitary landfill, the drainage lances are connected into a manifold and the gases and liquids are emptied into a common scavenging pipe; a driving means operatively connected to each drainage lance to provide an axial rotating movement to each drainage lance; a second suction device operatively connected to the drainage lances to create a negative pressure in the interior of the drainage lances for drawing-off the gases and liquids that are present in the sanitary landfill; and means for feeding the gases and liquids from both the first and second suction devices into the recycling installation for processing therein.

In another embodiment the invention comprises a process for the disposal of garbage stored in a sanitary landfill using a recycling installation, said process comprising the steps of: forming a stripping area enclosure by covering a stripping area in the sanitary land fill with airtight materials which are connected in an airtight manner to themselves and to the ground outside the stripping area; forming an apron area enclosure by covering an apron area in the recycling installation with airtight materials which are connected in an airtight manner to themselves and to the ground outside the apron area; creating a negative pressure in a range from ten to one hundred pascal in the stripping area enclosure and the apron area enclosure, the negative pressure is with respect to the areas outside the stripping area enclosure and the apron area enclosure; positioning drainage lances into the stripping area for drawing off gases and liquids which are present in the sanitary landfill; creating a negative pressure in the interior of the drainage lances for drawing-off gases and liquids that are present in the sanitary landfill; feeding the gases and liquids drawn off from the sanitary landfill to the recycling installation for processing therein; stripping garbage from the stripping area of the sanitary landfill; and transferring the garbage stripped from the sanitary landfill to the recycling installation for processing therein.

BRIEF DESCRIPTION OF THE DRAWINGS

In the following, the invention is described in detail with the aid of the attached drawings. The following are shown.

DETAILED DESCRIPTION

The inventive concept for the procedure is to cover and place under negative pressure the entire landfill that is to be excavated and sent for recycling, or that portion of it which is to be cut into and stripped. This region in which a reduced pressure is created and maintained includes not only the above-mentioned portion of the landfill—or possibly the landfill as a whole—but also the transport paths from the landfill to the recycling installation, as well as its loading and unloading areas and apron areas. It is advantageous, therefore, to place the site of the recycling facility as close as possible to the dump or landfill that is to be cleared.

At the same time, suitable means are brought into the landfill itself—preferably at its foot—by means of which the gases and liquids or sludge that exist or arise can be drawn off and likewise sent for recycling.

It is part of the inventive concept that the air that is contaminated by the gases, dust and aerosols that arise during the pressure reduction in the above-mentioned areas are likewise collected and recycled in the recycling installation.

In addition, it is part of the inventive procedure that the recycling installation is arranged with respect to its loading and unloading areas and apron areas in such a way that garbage transport vehicles can also deliver the household and industrial wastes that occur on a daily basis.

Figure 1:
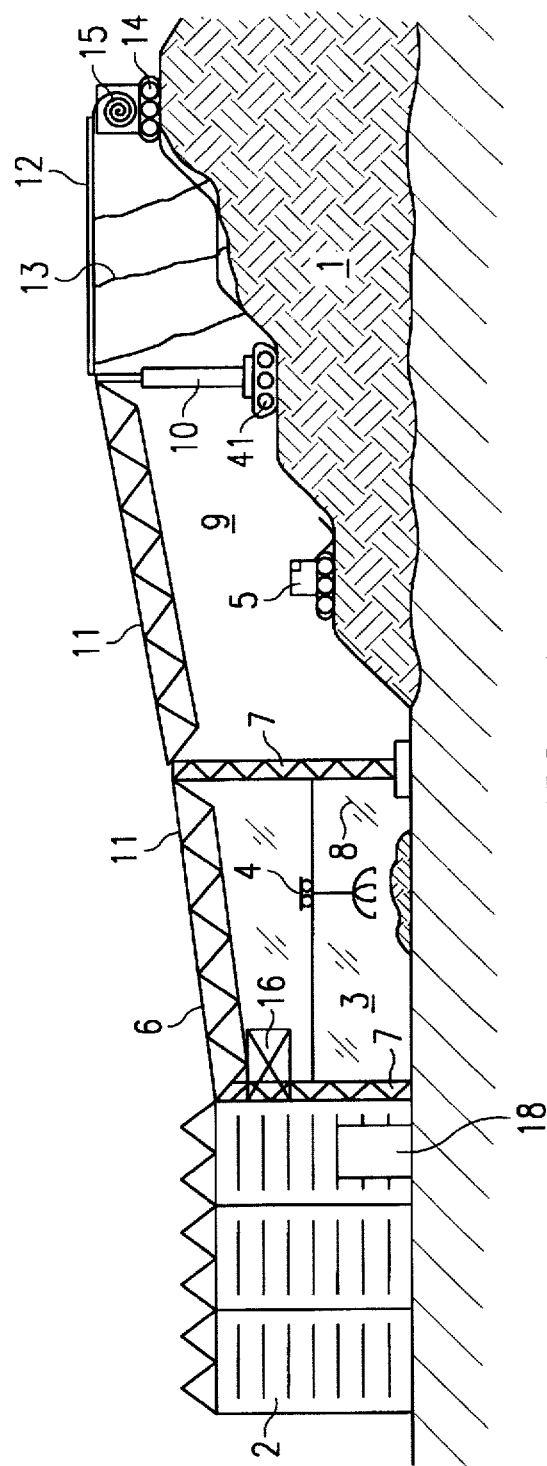
FIG. 1 A schematic side view of a first embodiment of the installation in accordance with the invention, FIG. 2 A schematic top view of the embodiment of FIG. 1, FIG. 3a A first embodiment of a detail of the installation, FIG. 3b A second embodiment of a detail of the installation, FIG. 4 A general drawing of the details in accordance with FIG. 3a,b, FIG. 5 A schematic side view of a second embodiment of the installation in accordance with the invention, FIG. 6 A schematic side view of a third embodiment of the installation in accordance with the invention.

In FIG. 1, which represents a schematic side view of an installation in accordance with the invention in a first embodiment, a sanitary landfill that is to be brought to recycling is designated by the number 1. At the foot of the sanitary landfill 1 or in its vicinity there is erected a recycling installation 2 that works in accordance with one of the known processes, preferably that of high-temperature gasification. An apron area 3 contains the technical means—such as a schematically represented excavating or grab crane 4, for example—for the unloading of the garbage transported to it by the loading vehicles 5 (one of these vehicles is shown in FIG. 1).

Figure 2:
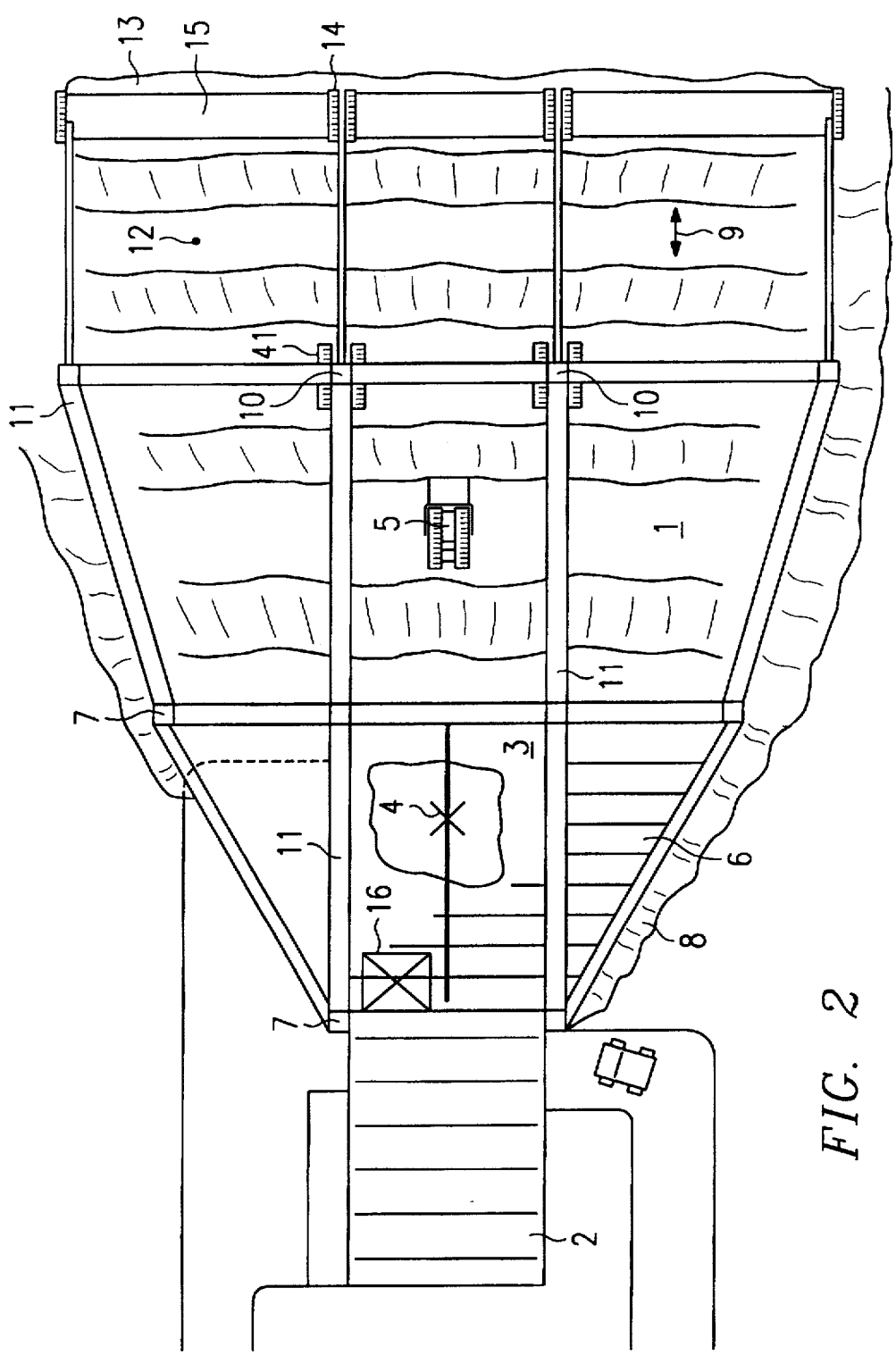

The same facility in accordance with the invention that is shown from the side in FIG. 1 is shown in a schematic top view in FIG. 2. The apron area 3 is roofed in by a roof 6 that is preferably fixed and that consists of lightweight structural elements that are joined to each other in an essentially airtight manner. The roof 6 rests on fixed supports 7. Connected at the sides to the roof 6 in an airtight manner are walls 8, which are themselves essentially airtight in turn. Likewise configured in an airtight manner is the connection of the walls 8 and the roof 6 to the facade of the recycling installation 2 that faces the apron area 3. The walls 8 can likewise be made of lightweight panels or of tarpaulins, the bottom seams of which lie against the ground in an airtight manner in the known manner of air-inflated structures.

Adjoining the apron area 3 is an actual stripping area 9. In it are found suitable means for the carrying of movable supports 10, for example, crawler vehicles 41, that carry movable supports 10 that preferably can be varied with respect to their height. Inserted between the fixed supports 7 and the movable supports 10 are lightweight beams 11, which in their entirety form a movable roof supporting framework, preferably, this supporting framework is covered with suitable tarpaulins 12, which along with other tarpaulins 13 at the sides, close off the entire stripping area 9 in an airtight manner. In place of manned loading vehicles 5, robotically controlled ones can also be used. In the same way, power shovels and cutting installations are also conceivable. The stripping methods as such are known, and are not of essence to the invention.

In FIGS. 1 and 2 an additional vehicle 14 is shown, which carries a tarpaulin roll 15 and is suitable and intended for continuously adapting the covering of the stripping area to the progress of the stripping.

The apron area 3 and the entire stripping area 9 are now closed off in an airtight manner against the remaining outside world. By means of a suitable suction apparatus 16—cross-flow or axial-flow blowers, for example—the pressure in the sealed-off space that has been described is now reduced somewhat to the range of about 10 Pa to 100 Pa. As a result, corresponding forces in the range of about 10 Newtons to 100 Newtons per square meter on the roof and wall surfaces, which does not cause any particular technical problems since such forces are in the range of the usual wind and snow loads.

In this way, care is taken that no dust, gases and aerosol of any kind can get out of the interior space that is closed off by the roof 6, 12 and side walls 8, 13.

The exhaust air from the suction apparatus 16 is sent to the recycling installation 2.

The recycling installation 2 exhibits a door 18 with an air lock—not shown—that lies behind it. This ensures that garbage vehicles can deliver current household and industrial garbage. This can be advisable for business and/or ecological reasons.

It is of course in the sense of the invention to place several recycling installations 2 alongside each other, especially when for process-engineering reasons practical upper limits are set on the size of such an installation.

Figure 3A:
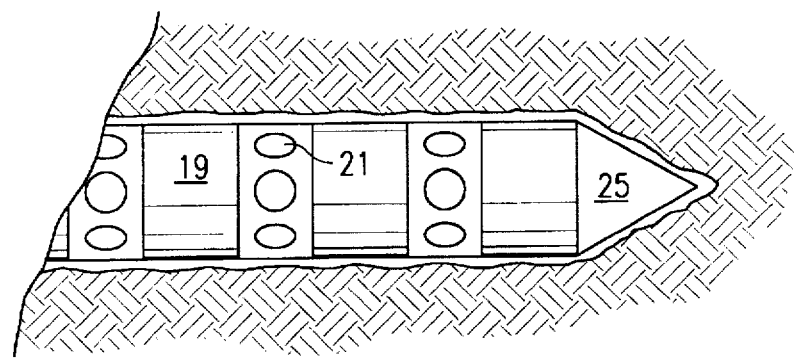
Figure 3B:
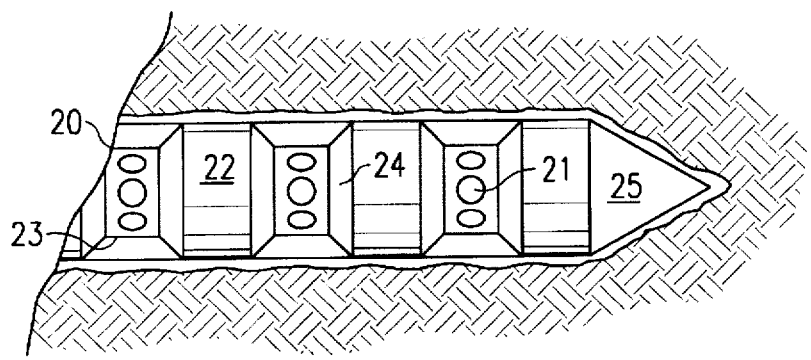

FIGS. 3a, b show two embodiments of drainage lances 19, 20. The first drainage lance 19 consists of a cylindrical pipe that bears holes 21 which, collected into bands, for example, are placed around the circumference and along the length of the pipe. The second drainage lance consists of first cylindrical segments 22 of a certain diameter and second cylindrical segments 23 of a smaller diameter, which are placed between the first cylindrical segments 22 with the larger diameter. The transitions between the first and second cylindrical segments are formed by segments 24 that have the shape of a truncated cone. The segments 22, 23, 24 are, for example, welded to one another. The second cylindrical segments with the smaller diameter also bear holes 21, which are distributed around its circumference.

Both embodiments of the drainage lances 19, 20 bear a point 25. The drainage lances can either be inserted into the sanitary landfill 1 directly—through the use of hydraulic means, for example—or be placed into drainage pipes (not shown) that exhibit holes as well.

Figure 4:
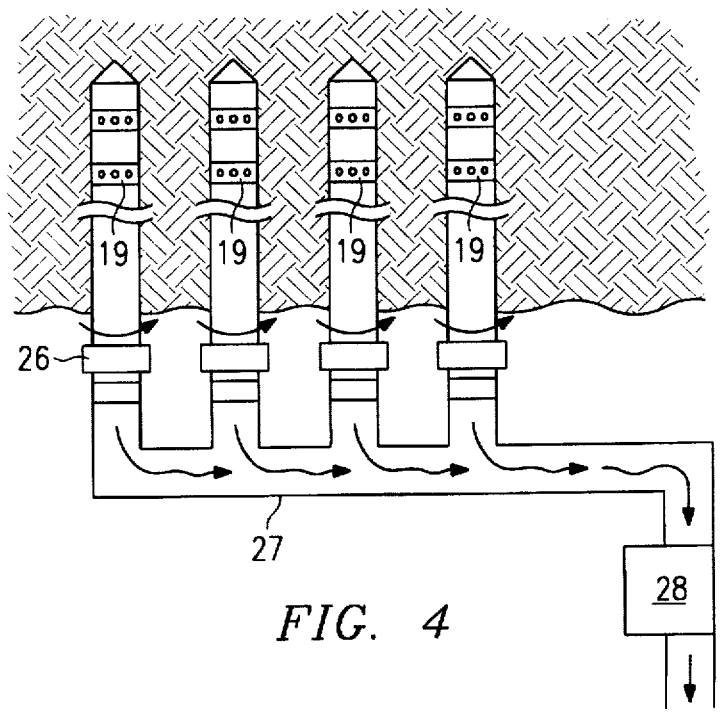

As is shown in FIG. 4, provision is made for combining a number of drainage lances 19 or 20 into a manifold.

The individual drainage lances 19 or 20 then empty into a common scavenging pipe 27. On this there is found an additional suction apparatus 28, the discharge of which is in turn fed to the recycling installation 2. Each drainage lance 19, 20 is coupled with driving means 26, which allow the drainage lances 19 or 20 to turn around their longitudinal axes.

In order to carry out the process in accordance with the invention in the stripping area 9 of the sanitary landfill 1, the above-mentioned drainage lances 19, 20 are inserted, preferably from all accessible sides, into the floor area of the sanitary landfill 1. Thus, gases and liquids that have soaked into the ground in the sanitary landfill 1 can be continuously removed.

Figure 5:
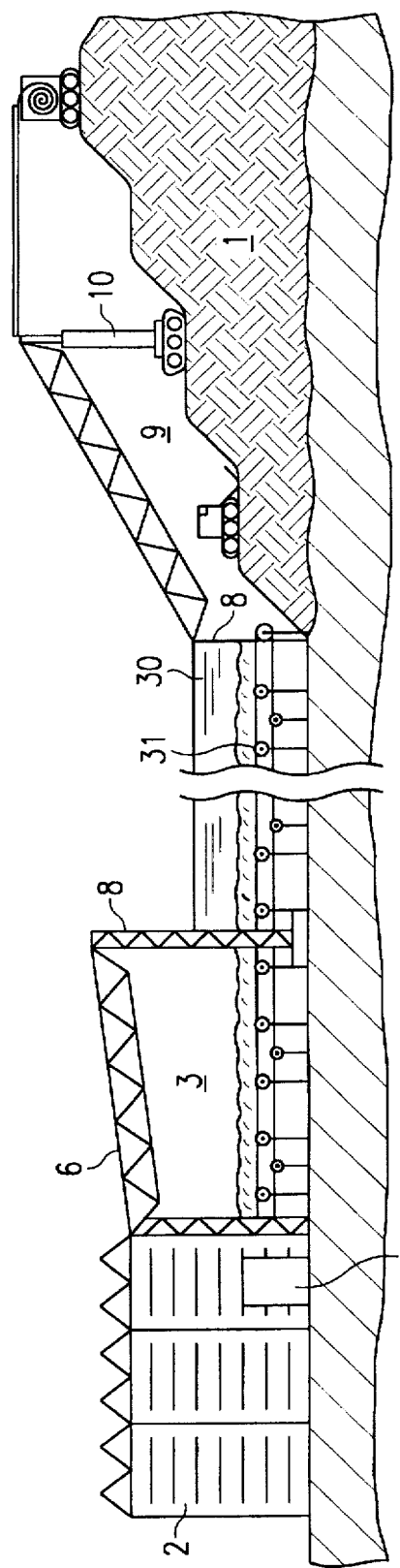

When in the course of the ongoing stripping of the sanitary landfill 1, the distance between the stripping area 9 and the recycling installation 2 and its apron area 3 becomes larger, both the installation in accordance with the invention as well as the process in accordance with the invention are adapted to these conditions. FIG. 5 shows a first version of this.

If need be, the covering of the apron area 3, consisting of the roof 6 and the walls 8, is adapted to the altered requirements to the extent that in essence, the apron area 3 must still be used as an air lock for the feeder mechanisms and the loading and unloading of the garbage. The stripping area 9 with its movable supports 10 moves itself, in accordance with the invention, further away from the recycling installation 2. As a result, the transport path for the garbage becomes longer. The enclosure formed by the roof 6 and the side walls made from the tarpaulins 13 is broken off in the transport region. Between the stripping area 9 and the apron area 3, a tunnel 30 is built which consists, for example, of plastic elements and which accommodates and seals from the outside world a conveyor belt mechanism 31. Since both the tunnel 30 and the conveyor belt mechanism 31 are made up of sections, a step-by-step lengthening of the transport path is easily possible. The tunnel 30 is, for example, used at the same time as a pipeline for the air that is pumped out of the stripping area 9, and is dimensioned accordingly. At this stage of the stripping and recycling process, the side of the apron area 3 that faces the stripping area 9 is likewise provided with a wall 8 for the airtight sealing off of the apron area 3.

Figure 6:
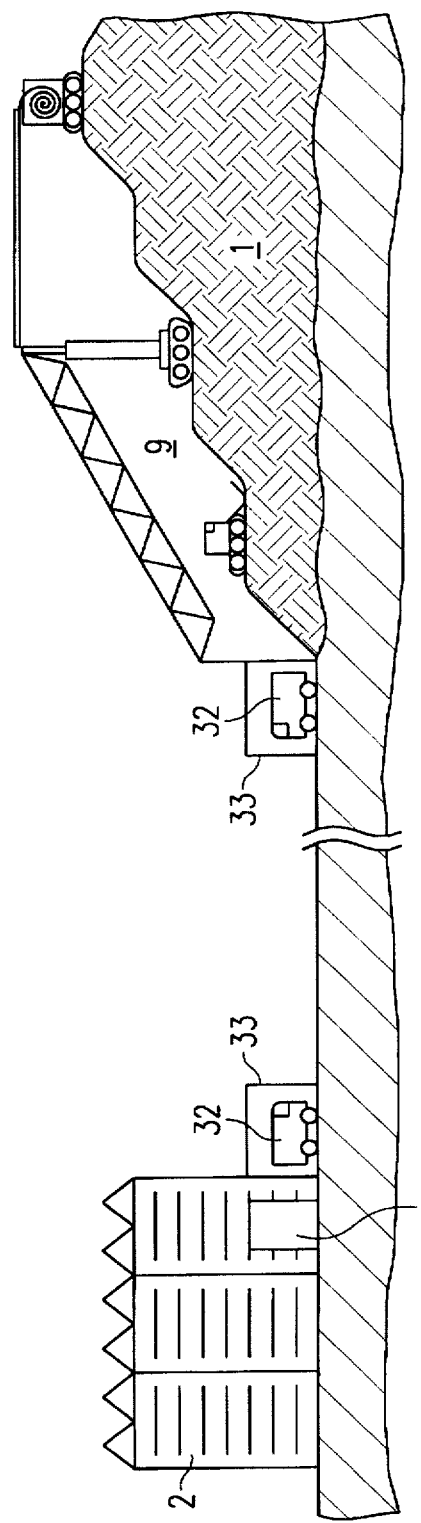

In the second version in accordance with FIG. 6, closed transport vehicles 32 are used in place of the conveyor belt mechanism 31. These vehicles are loaded in the stripping area 9 and unloaded in the recycling installation 2. In order that the necessary negative pressure can be maintained in the stripping area 9, it has added to it one—or more—air locks 33. The recycling installation 2 is here provided with—in place of the apron area 3—an airlock 33. The closed transport vehicles likewise exhibit means for pumping air out of the loading space to the extent that the same pressure difference in the range from 10 Pa to 100 Pa can be established. The above-mentioned means consist, for example, of cross-flow or axial-flow blowers which feed their exhaust air—by means of suitable filtering equipment—into the intake of the vehicle's engine.

In addition, the stripping area 9 is also connected to the recycling installation 2 by means of pipelines—not shown—which on the one hand transport the quantities of air that are necessary for maintaining the negative pressure that is provided in the stripping area, and on the other, feed to the recycling installation 2 the gases and liquids that are drawn from the foot area of the sanitary landfill 1 by means of the previously mentioned lances 19 or 20.

In addition, it can also be advisable in the case of several sanitary landfills 1 that have to be stripped, and that might be located far from each other, to set up a single recycling installation 2. It then becomes impractical to generate in a centralized manner the necessary negative pressure under the covers of the sanitary landfills 1. In this version—not shown—each sanitary landfill 1 is allocated one suction apparatus 16 and one incinerator, which is only responsible for disposing of the exhaust air that is laden with harmful gases and dust. If as a result of the prevailing conditions at the sanitary landfill 1 it is also necessary to install the drainage lances 19 or 20 in accordance with the invention, then a suction apparatus 28 is allocated to them as well inside the stripping area 9. The liquids and sludge that are drawn off are transferred to the recycling installation 2 by means of the transport vehicles 32.

What is claimed is:

1. Apparatus for the disposal of garbage that is stored in sanitary landfills, having gases and liquids present therein, with a recycling installation comprising:
   a stripping area located adjacent to the sanitary landfill;
   an apron area located adjacent to the recycling installation;
   a stripping area enclosure including:
      a stripping area roof and stripping area walls positioned to cover the stripping area, said stripping area roof and said stripping area walls comprise substantially airtight materials which are connected in a substantially airtight manner to themselves and to the ground outside the stripping area; and
      movable supports for supporting the stripping area roof and the stripping area walls;
   an apron area enclosure including:
      an apron area roof and apron area walls positioned to cover the apron area, said apron area roof and apron area walls comprise substantially airtight materials which are connected in a substantially airtight manner to themselves and to the ground outside the apron area; and
      fixed supports for supporting the apron area roof the apron area walls, and the airtight materials covering the apron area;
   mechanical means for the stripping of garbage from the sanitary landfill;
   mechanical means for transporting the stripped garbage from the stripping area to the apron area;
   a first suction device for the creation of a negative pressure in the apron area enclosure and the stripping area enclosure in a range from ten to one hundred pascal in the stripping area enclosure and the apron area enclosure, the negative pressure is with respect to the areas outside the stripping area enclosure and the apron area enclosure;
   drainage lances positioned into the stripping area of the sanitary landfill, said drainage lances are tubular in shape and include holes in the sides of the drainage lances for drawing off the gases and liquids which are present in the sanitary landfill, the drainage lances are connected into a manifold and the gases and liquids are emptied into a common scavenging pipe;
   a driving means operatively connected to each drainage lance to provide an axial rotating movement to each drainage lance;
   a second suction device operatively connected to the drainage lances to create a negative pressure in the interior of the drainage lances for drawing-off the gases and liquids that are present in the sanitary landfill; and
   means for feeding the gases and liquids from both the first and second suction devices into the recycling installation for processing therein.

2. Apparatus as set forth in claim 1 wherein the apron area enclosure and the stripping area enclosure are joined to form a common covered area, and wherein the mechanical means for transporting the stripped garbage from the stripping area to the apron area comprises a grab crane.

3. Apparatus as set forth in claim 1, further comprising an intermediate area separating the stripping area from the apron area.

4. Apparatus as set forth in claim 3 further comprising a substantially airtight tunnel positioned in the intermediate area, said tunnel being connected to the stripping area enclosure and the apron area enclosure in a substantially airtight manner, and wherein the mechanical means for transporting the stripped garbage from the stripping area to the apron area comprises a conveyor belt mechanism which is positioned within the tunnel.

5. Apparatus as set forth in claim 3 wherein the mechanical means for transporting the stripped garbage from the stripping area to the apron area comprises a transport vehicle whose load-carrying area is structured to be airtight and placed under negative pressure, wherein said stripping area enclosure includes a first air lock to allow the transport vehicle to drive in and out of the stripping area enclosure without substantially breaking the negative pressure in the stripping area enclosure, wherein said apron area enclosure includes a second air lock to allow the transport vehicle to drive in and out of the apron area enclosure without substantially breaking the negative pressure in the apron area enclosure.

6. Apparatus for the disposal of garbage that is stored in sanitary landfills, having gases, liquids, and sludge present therein, with a recycling installation comprising: a stripping area located in the sanitary landfill;, an apron area located in the recycling installation; an intermediate area between the stripping area and the apron area;

a stripping area enclosure including:
  a stripping area roof and stripping area walls positioned to cover the stripping area, said stripping area roof and said stripping area walls comprise substantially airtight materials which are connected in a substantially airtight manner to themselves and to the ground outside the stripping area; and
  movable supports for supporting the stripping area roof and the stripping area walls;
an apron area enclosure including:
  an apron area roof and apron area walls positioned to cover the apron area, said apron area roof and apron area walls comprise substantially airtight materials which are connected in a substantially airtight manner to themselves and to the ground outside the apron area; and
  fixed supports for supporting the apron area roof the apron area walls, and the airtight materials covering the apron area;
mechanical means for the stripping of garbage from the sanitary landfill;
transport vehicles for transporting the stripped garbage from the stripping area to the apron area;
a first suction device for the creation of a negative pressure in the apron area enclosure in a range from ten to one hundred Pascal in the apron area enclosure, the negative pressure is with respect to the areas outside the apron area enclosure;
means for feeding the gases from the first suction devices into the recycling installation for processing therein;
drainage lances positioned into the stripping area of the sanitary landfill, said drainage lances are tubular in shape and include holes in the sides of the drainage lances for drawing off the gases and liquids which are present in the sanitary landfill, the drainage lances are connected into a manifold and the gases and liquids are emptied into a common scavenging pipe;
a driving means operatively connected to each drainage lance to provide an axial rotating movement to each drainage lance;
a second suction device operatively connected to the drainage lances to create a negative pressure in the interior of the drainage lances for drawing-off the liquids and sludge that are present in the sanitary landfill and for transferring the liquids and sludge collected from the sanitary landfill to the transport vehicle;
a third suction device for the creation of a negative pressure in the stripping area enclosure, the negative pressure is with respect to the areas outside the stripping area enclosure; and
an incinerator device operatively installed to receive the exhaust air from the third suction device for processing therethrough.

7. Apparatus as set forth in claim 1 wherein said drainage lances are cylindrical in shape.

8. Apparatus as set forth in claim 1 wherein said drainage lances comprise first cylindrical segments of a first diameter and second cylindrical segments of a second diameter which is larger than said first diameter, said first and second cylindrical segments are connected by segments having the shape of a truncated cone, said first cylindrical segments include holes formed in the wall thereof.

9. Apparatus as set forth in claim 7 or 8 wherein said drainage lances are positioned directly into the sanitary landfill.

10. A process for the disposal of garbage stored in a sanitary landfill using a recycling installation, said process comprising the steps of:
  forming a stripping area enclosure by covering a stripping area in the sanitary land fill with airtight materials which are connected in an airtight manner to themselves and to the ground outside the stripping area;
  forming an apron area enclosure by covering an apron area adjacent to the recycling installation with airtight materials which are connected in an airtight manner to themselves and to the ground outside the apron area;
  creating a negative pressure in a range from ten to one hundred pascal in the stripping area enclosure and the apron area enclosure, the negative pressure is with respect to the areas outside the stripping area enclosure and the apron area enclosure;
  positioning drainage lances into the stripping area for drawing off gases and liquids which are present in the sanitary landfill;
  creating a negative pressure in the interior of the drainage lances for drawing-off gases and liquids that are present in the sanitary landfill;
  feeding the gases and liquids drawn off from the sanitary landfill to the recycling installation for processing therein.
  stripping garbage from the stripping area of the sanitary landfill; and
  transferring the garbage stripped from the sanitary landfill to the recycling installation for processing therein.

11. The process of claim 10 further comprising the steps of:
  providing a substantially airtight tunnel in an intermediate area between the stripping area and the apron area and connecting the tunnel to the stripping area enclosure and the apron area enclosure;
  creating a negative pressure in the tunnel, the negative pressure is with respect to the areas outside the of the stripping area enclosure and the apron area enclosure;
  positioning a conveyor belt mechanism in the tunnel; and running the conveyor belt mechanism to transport the stripped garbage from the stripping area to the apron area.

12. The process of claim 10 further comprising the steps of:
  providing a transport vehicle with,a load carrying area which is structured to be placed under a negative pressure;
  providing a first air lock in the stripping area enclosure to allow the transport vehicle to drive in and out of the stripping area enclosure without breaking the negative pressure in the stripping area enclosure; and
  providing a second air lock in the apron area enclosure to allow the transport vehicle to drive in and out of the apron area enclosure without breaking the negative pressure in the apron area enclosure; and wherein said step of transferring the garbage includes:
  loading the stripped garbage into the load carrying area of the transport vehicle; and
  transporting the stripped garbage in the load carrying area of the transport vehicle from the stripping area to the apron area.

\* \* \* \* \*

UNITED STATES PATENT AND TRADEMARK OFFICE
CERTIFICATE OF CORRECTION

PATENT NO. : 5,716,165
DATED : February 10, 1998
INVENTOR(S) : Herbert A. Burgert It is certified that error appears in the above-indentified patent and that said Letters Patent is hereby corrected as shown below:

Col. 3, line 49, delete "framework, preferably",
insert --framework. Preferably --.

Col. 7, line 9-11, delete
"comprising: a stripping area located in the sanitary landfill;, an apron area located in the recycling installation; an", insert --comprising:
a stripping area located in the sanitary landfill;
an apron area located in the recycling installation; an--.

Col. 8, line 37, delete "therein.", insert --therein;--.

Col. 8, line 59, delete "with,a", insert --with a--.

Signed and Sealed this

Fourteenth Day of July, 1998

Attest:

BRUCE LEHMAN

*Attesting Officer*      *Commissioner of Patents and Trademarks*